No. 802,061. PATENTED OCT. 17, 1905.
W. G. THOMAS.
MACHINE FOR AUTOMATICALLY SHAPING MASSES OF DOUGH TO THE FORMS REQUIRED FOR LOAVES.
APPLICATION FILED DEC. 3, 1904.

4 SHEETS—SHEET 1.

Witnesses
Inventor
William Gwynne Thomas
BY Richards
ATTORNEYS

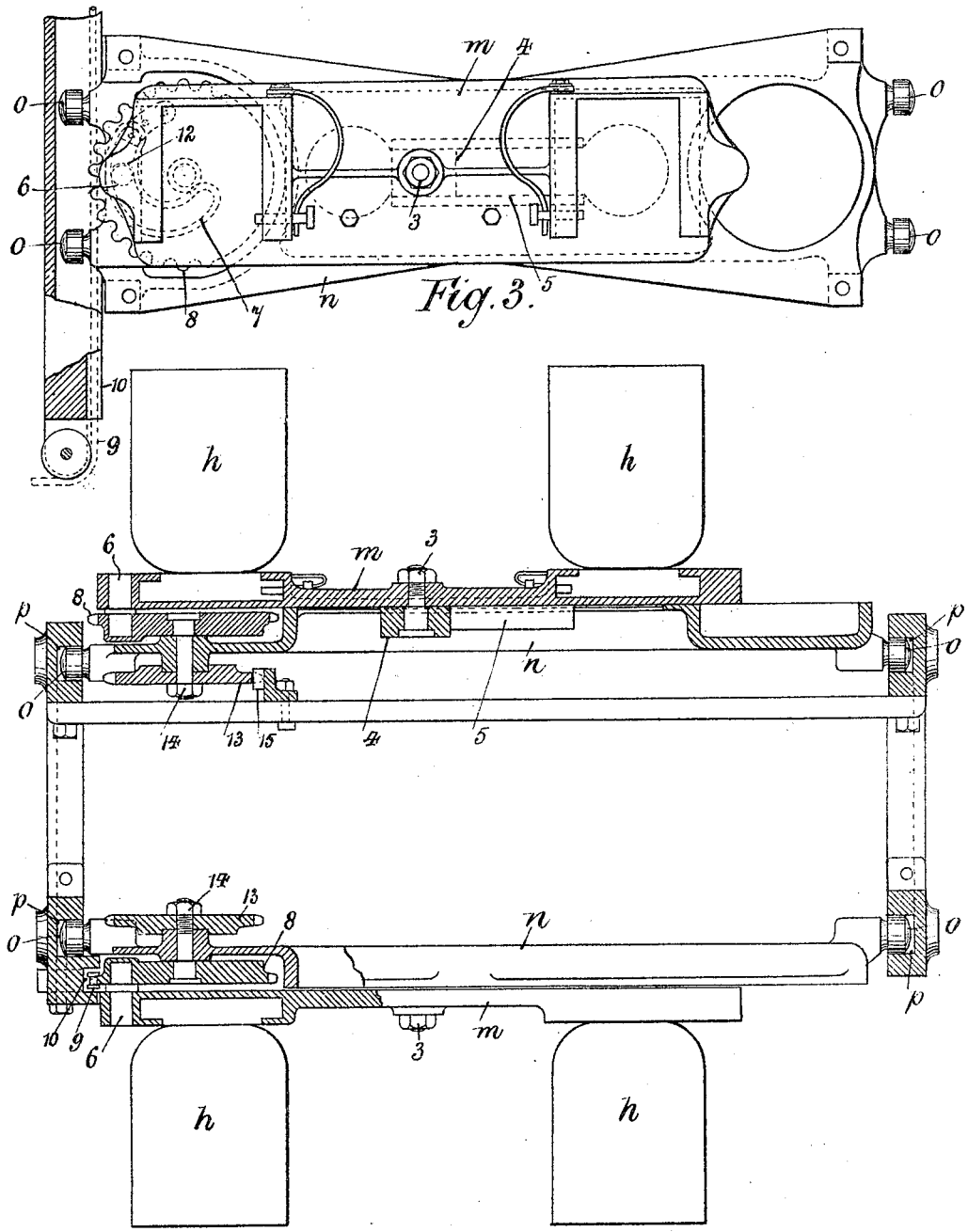

No. 802,061. PATENTED OCT. 17, 1905.
W. G. THOMAS.
MACHINE FOR AUTOMATICALLY SHAPING MASSES OF DOUGH TO THE FORMS REQUIRED FOR LOAVES.
APPLICATION FILED DEC. 3, 1904.

4 SHEETS—SHEET 4.

Witnesses
Inventor
William Gwynne Thomas

UNITED STATES PATENT OFFICE.

WILLIAM GWYNNE THOMAS, OF CARDIFF, ENGLAND, ASSIGNOR TO ALBERT CHARLES MACINTOSH, OF CARDIFF, ENGLAND.

MACHINE FOR AUTOMATICALLY SHAPING MASSES OF DOUGH TO THE FORMS REQUIRED FOR LOAVES.

No. 802,061.      Specification of Letters Patent.      Patented Oct. 17, 1905.

Application filed December 3, 1904. Serial No. 235,372.

*To all whom it may concern:*

Be it known that I, WILLIAM GWYNNE THOMAS, a subject of the King of Great Britain and Ireland, residing at No. 8 East Grove, Cardiff, in the county of Glamorgan, England, have invented a new and useful Improved Machine for Automatically Shaping Masses of Dough to the Form Required for Loaves, of which the following is a specification.

This invention relates to an improved construction of machine whereby dough may be shaped to the globular form of a loaf without being manipulated by hand, the shaped mass being delivered straightway from the machine for the purpose of being baked.

The kind of loaf which this machine is adapted to produce is that known as the "cottage loaf," made up of a single globular piece or of two globular-shaped portions stuck together having a profile of the shape of the figure 8.

Figure 1:
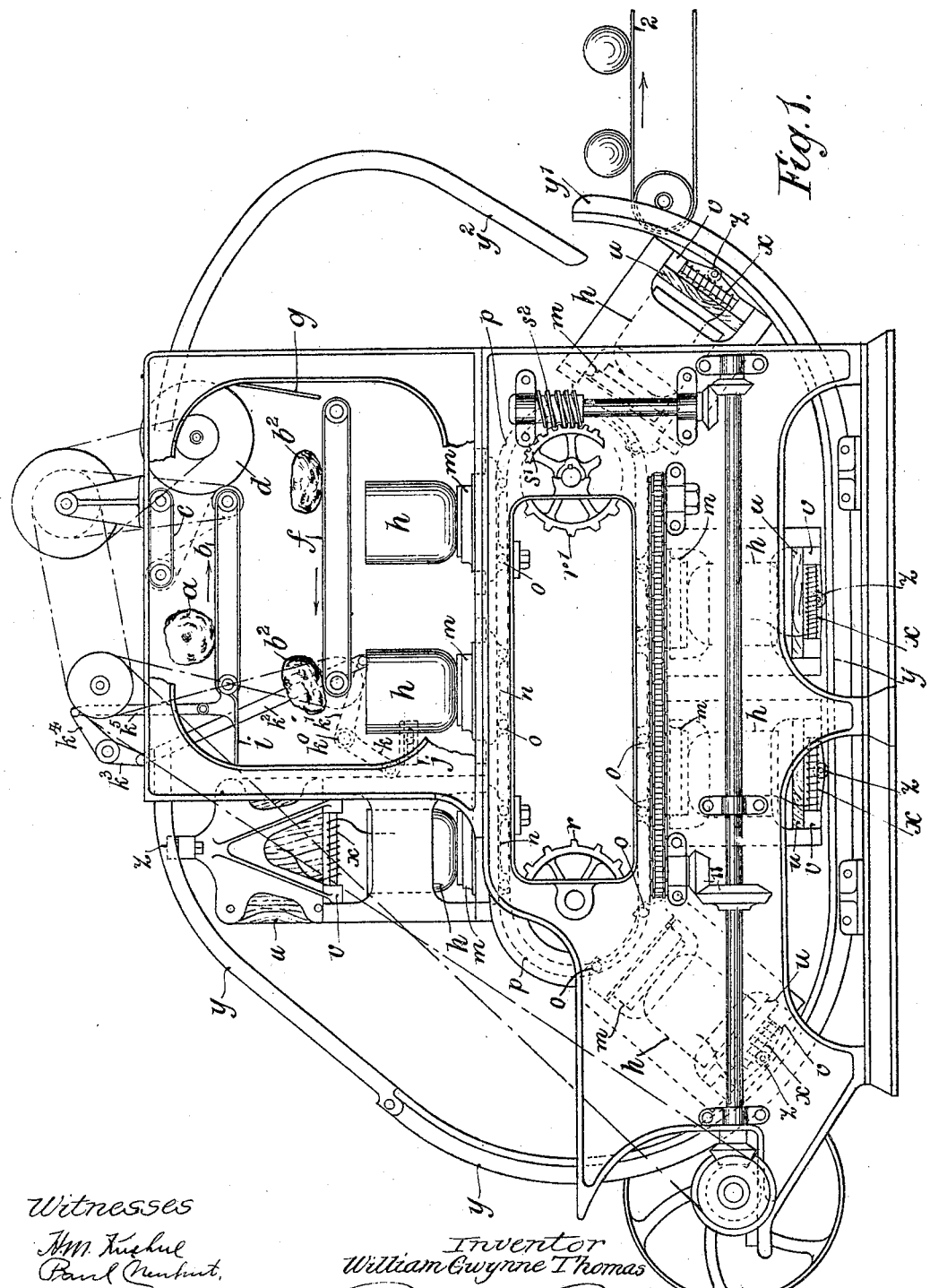
Figure 2:
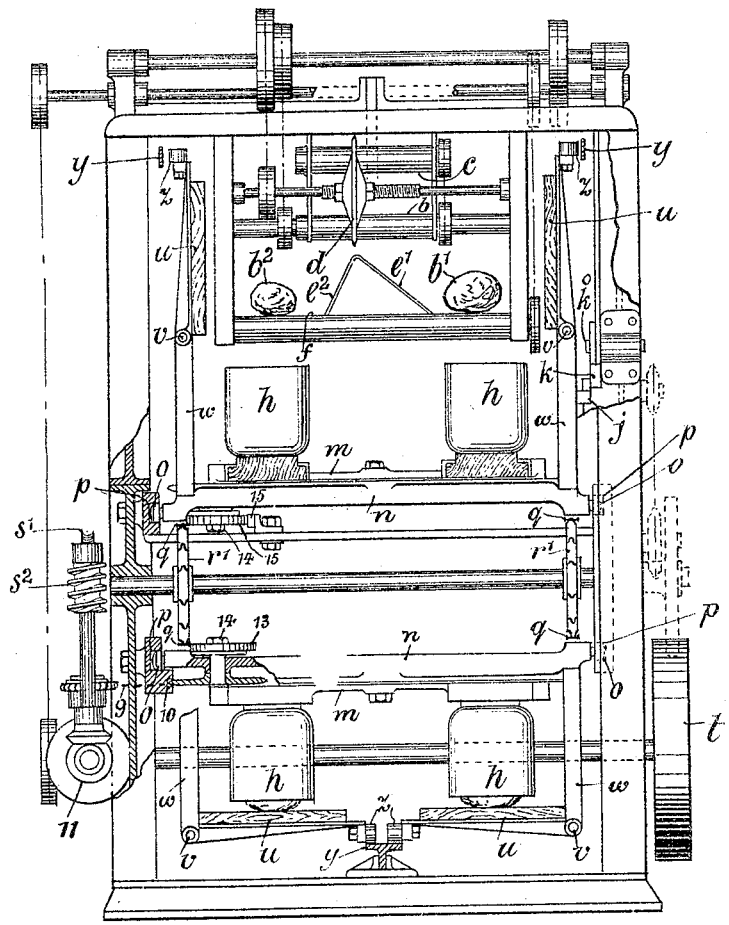
Figure 5:
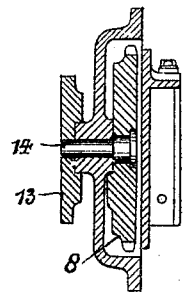
Figure 6:
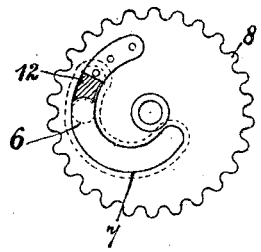
Figure 7:
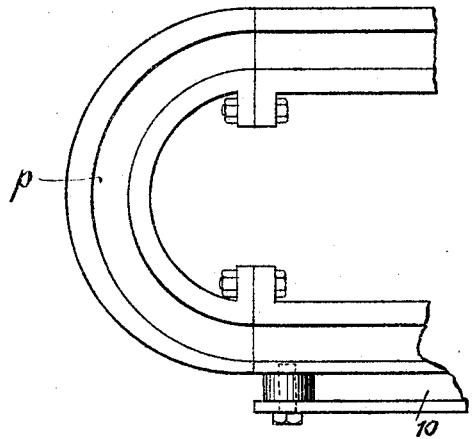

Referring to the accompanying drawings, which represent an advantageous form of construction of the machine, Figure 1 is a side elevation, portions of which are broken away for the purpose of exhibiting the structure. Fig. 2 is an end elevation, partly in section and having some other parts removed for the sake of clearness. Figs. 3 to 7, which are drawn to a larger scale, show the details of the construction.

In these figures it will be seen that a number of bowls carried on an endless chain and fitted with lids are adapted each to receive a mass of dough. By suitable mechanism, to to be presently described, the lids are automatically closed down, the bowls receive an oscillatory motion, and during their transit along the path of the endless chain the bowls become inverted, with the result that the rolling of the mass of dough on the bottom of the bowl, succeeded by the rolling of the mass on the integral surface of the lid when the bowls are inverted, causes the dough to assume a globular shape, after which while the bowls are still partially inverted the lid is allowed to open and permit the globular mass to roll onto a traveling belt, which conveys it away from the machine to be baked. Two such globes may be stuck together before baking or each may be baked separately.

The masses of dough $a$ to be operated on are dropped onto a traveling band $b$, by which they are conveyed beneath a band $c$, which travels in the same direction. The dough is flattened between the two bands and pressed toward the edge of a revolving cutting-disk $d$, whereby it is parted into two masses $b'$ $b^2$, each portion of which is deflected laterally by inclined surfaces $e'$ $e^2$, so directed as to deliver them onto a band $f$, which travels in the opposite direction. The disk $d$ is carried on a screw-threaded spindle, whereby its lateral position may be adjusted in order that the mass of dough $a$ may be divided into portions $b'$ $b^2$, which bear any desired proportion to one another. A plate $g$ insures the dropping of the masses of dough onto the band $f$. The band $f$ is adapted to deliver the masses of dough $b'$ $b^2$ into open bowls $h\ h$, which travel in the same direction beneath the band $f$. To insure the dropping of the masses into the bowls, a hinged flap $i$ stands in a vertical position, so as to retain the masses of dough $b'$ $b^2$ on the band $f$ until the bowls arrive at such positions beneath as to receive the falling masses. On arriving at such positions a moving ledge $j$, which is adjustable in situation, comes in contact with a roller carried on an arm $k$ of a bell-crank lever pivoted at $k^{\circ}$, the other arm $k'$ of which is by a series of links and levers $k^2, k^3, k^4$, and $k^5$ connected to the hinged flap $i$. On thrusting the arm $k$ upward the flap $i$ is caused to rise and let the masses of dough $b'$ $b^2$ drop into the open bowls. After the roller on the arm $k$ has passed over the ledge $j$ the flap will be again allowed to drop into the vertical position by gravity.

The bows $h$ are secured in pairs, one to each end of a carriage $m$, which is mounted in a movable manner on a cross-plate $n$. There are a number of such plates $n$, each of which has at each of its two ends a pair of rollers $o\ o$, which fit into endless grooves or races $p\ p$, one of which is provided on each side of the machine. Each of the grooves consists of two straight horizontal portions, which at the ends thereof are connected together by semicircular portions, Fig. 7. The cross-plates $n\ n$ are at each end connected together by a chain of links $q$, which wrap around sprocket-wheels $r\ r'$. The sprocket-wheel $r'$ is driven by a worm-wheel $s'$ and worm $s^2$, which latter receives its movement through bevel-wheels from a belt-driven pulley $t$. By such means the cross-pieces $n\ n$ are maintained in continuous movement, and the bowls $h\ h$ are conveyed in such a manner as to alternately stand upright and become inverted.

In order that the masses of dough may be retained within the bowl when it assumes the inverted position, each bowl is provided with a lid $u$, which is hinged at $v$ to a bracket $w$, secured to the end of the cross-piece $n$. By means of a helical spring $x$ the lids tend to open and remain open, and at the appropriate time, after the bowls have received the masses of unshapen dough, the lids are gradually closed down and retained in a closed position by the pressure of a curved race $y$ on a roller $z$, mounted on the end of each of the lids. On reaching the end $y'$ of the roller-race the lid $u$ of the bowl will be free to open, and to insure its opening a roller-race $y^2$ interposes itself on the other side of the roller $z$. The lid is open while the bowl is still inclined slightly downward, with the result that the contents of the bowl are discharged onto a traveling band 2, which conveys the now shapen masses of dough away from the machine.

In order that during its transit through the machine the masses of dough may acquire the desired globular shape, the bowls, both when upright and also when inverted, have imparted to them a vibratory movement, which causes the dough to be rolled to and fro on the bottom of the bowl and alternately on the surface of the lid when the bowl is inverted. The amplitude of the vibratory movement is arranged to be comparatively small when the bowl is upright and about to receive a mass of dough.

The vibration is effected as follows: The carriage $m$, to which the bowls are secured, is pivoted on a stud 3, carried on a block 4, which is fitted to slide in a slotway 5, formed in the cross-piece $n$. At one end of the carriage $m$ a stud 6 is secured, the end of which fits in a curved groove 7, formed in the face of the sprocket-wheel 8. When the bowls are in the inverted positions, the wheel 8 engages with a pitch-chain 9, carried in a groove 10 in the frame of the machine and actuated by a bevel-gearing 11. By causing the pitch-chain 9 to travel in a direction opposite to that of the movement of the sprocket-wheel 8 the latter will be caused to rotate comparatively quickly. The result will be to cause the bowls to receive a movement of swinging about the center of the stud 3, which latter is required to reciprocate in the slotway 5, and this compound motion will be superposed on that of translation of the bowls along the path of the roller-race. When the bowls are inverted, the direction of rotation is such that the stud 6 engages with the end of the curved groove of large radius, a buffer 12, made of rubber or other resilient material, being provided in the end of the groove to lessen the shock on the reversal of motion.

When the bowls are in the upright position, Fig. 4, the sprocket-wheel 8 will be out of engagement with the pitch-chain 9; but the spur-wheel 13, which is keyed to the spindle 14, to which also the sprocket-wheel 8 is keyed, will engage with a toothed rack 15, secured to the frame of the machine. The effect of the translation of the bowls and the engagement of the spur-wheel 13 with the fixed rack 15 will be to cause the stud 6 to move to the end of the curved groove 7 of small radius, the result of which will be to cause the amplitude of vibration of the bowls to be a minimum, and thus facilitate the receipt of the masses of dough when they drop from the belt $f$.

This invention is an improvement on Patent No. 747,901, in which the path described by the bowls is circular. In the working of that invention it has been found that the effect of centrifugal force, together with that of the shortness of the time during which the bowls are in the inverted position and vigorously vibrated, results in the masses of dough being imperfectly shaped because of insufficient rolling. By adding to the circular path interposed portions which are straight, during the transit of which there will be no centrifugal force, and which straight portions can be prolonged to any desired extent, the masses of dough are caused to attain a globular shape much more perfectly.

I claim—

1. An apparatus for automatically shaping dough into globular masses for the manufacture of loaves, comprising a lid-fitted bowl, a carriage to which the bowl is secured, a cross-piece on which the carriage is pivotally mounted, a pair of tracks placed parallel to one another, each in a vertical plane, each track having two portions which are approximately straight and horizontal and two curved portions connecting the ends of the straight portions, and means for causing the cross-piece to continuously travel along the closed tracks.

2. An apparatus for automatically shaping dough into globular masses for the manufacture of loaves, comprsing a lid-fitted bowl, a carriage to which the bowl is secured, a cross-piece on which the carriage is pivotally mounted, a pair of tracks placed parallel to one another, each in a vertical plane, each track having two portions which are approximately straight and horizontal and two curved portions connecting the ends of the straight portions, means for causing the cross-piece to continuously travel along the closed tracks, and means for causing the lid to automatically close when the cross-piece arrives at the end of one straight portion of the tracks and to open when at the end of the other straight portion.

3. An apparatus for automatically shaping dough into globular masses for the manufacture of loaves, comprising a lid-fitted bowl, a carriage to which the bowl is secured, a cross-piece on which the carriage is pivotally mounted on a sliding block, a pair of tracks placed parallel to one another, each in a vertical plane, each track having two portions which are approximately straight and horizontal and two curved portions connecting the ends of the straight portions, means for causing the cross-piece to continuously travel along the closed tracks and means for vibrating the carriage relatively to the cross-piece.

4. An apparatus for automatically shaping dough into globular masses for the manufacture of loaves comprising a series of lid-fitted bowls, a series of carriages to which the bowls are secured, a series of cross-pieces on which the carriages are pivotally mounted, a pair of tracks placed parallel to one another, each in a vertical plane, each track having two portions which are approixmately straight and horizontal, and two curved portions connecting the ends of the straight portions, two endless chains connecting the cross-pieces, a sprocket-wheel for each chain, adapted to gear therewith, and means for actuating the sprocket-wheels.

5. An apparatus for automatically shaping dough into globular masses for the manufacture of loaves comprising a series of lid-fitted bowls, a series of carriages to which the bowls are secured, a series of cross-pieces on which the carriages are pivotally mounted on a sliding block, a pair of tracks placed parallel to one another, each in a vertical plane, each track having two portions which are approximately straight and horizontal, and two curved portions connecting the ends of the straight portions, two endless chains connecting the cross-pieces, a sprocket-wheel for each chain, adapted to gear therewith, means for actuating the sprocket-wheels and a pair of toothed wheels secured to a spindle adapted to revolve relatively to the cross-piece, a fixed rack adapted to engage with one toothed wheel in the erect position of the bowls, a gear-operated chain adapted to engage with the other toothed wheel when the bowls are in an inverted position and cause rotation in a direction opposite to that derived from the fixed rack, a groove of varying radius formed in one face of the latter toothed wheel, and a stud secured to the carriage and adapted to engage with the end of the groove of small radius when the bowls are erect and with the other end when the bowls are inverted.

6. In an apparatus for automatically shaping dough into globular masses for the manufacture of loaves, comprising a series of bowls mounted so as to travel in an endless path and assume an upright position at a defined portion of the path, a device for feeding masses of dough to the bowls at such a defined position, comprising an endless traveling belt, a hinged flap adapted to occupy a vertical position and then retain the masses of dough on the belt, a ledge secured so as to partake of the motion of the bowls, a roller carried on the arm of a lever and adapted to engage with the ledge, and a linkage connecting the roller-arm with the hinged flap, adapted to raise the flap when engagement of the ledge with the roller takes place.

In testimony whereof I have signed my name to this specification in the presence of two subscribing witnesses.

WILLIAM GWYNNE THOMAS.

Witnesses:
 ERNALD SIMPSON MOSELEY,
 MALCOLM SMETHURST.